J. W. McQUEEN.
ROTARY MOTOR.
APPLICATION FILED SEPT. 6, 1917.

1,321,932.

Patented Nov. 18, 1919.
2 SHEETS—SHEET 2.

Witness
Charles Balg
Chas. W. Stauffer

Inventor
James W. McQueen.
By
Attorneys

UNITED STATES PATENT OFFICE.

JAMES W. McQUEEN, OF DETROIT, MICHIGAN.

ROTARY MOTOR.

1,321,932.  Specification of Letters Patent.  Patented Nov. 18, 1919.

Application filed September 6, 1917. Serial No. 189,903.

*To all whom it may concern:*

Be it known that I, JAMES W. MCQUEEN, a citizen of the United States of America, residing at Detroit, in the county of Wayne and State of Michigan, have invented certain new and useful Improvements in Rotary Motors, of which the following is a specification, reference being had therein to the accompanying drawings.

This invention relates to rotary motors operated by air or motive fluid under pressure and more particularly to a motor especially designed as a holder for a pneumatic tool and as an operating means therefor.

My invention aims to provide a rotary motor of the above type wherein positive, reliable and safe means, actuated by motive fluid, are employed for imparting movement to a drive shaft, with a minimum degree of friction and with a maximum efficiency. It is essential that this type of motor be portable, easy to control and compact. With this end in view, the motor has been designed and constructed to include such essential features and yet possess, to the highest degree attainable, durability, lightness and simplicity of construction that avoids the use of packing, springs and the like.

Durability and compactness are secured by the various parts of a motor being properly fitted and assembled whereby easy access is had to the same for lubrication and repair, both of which are seldom necessary on account of anti-frictional devices being distributed to compensate for wear and end thrust besides providing an equally balanced driven tool holder.

A novel feature of my rotary motor is a chambered cylinder having an exhaust port, common to the chambers of the cylinder and so disposed that driven elements in the chambers of the cylinder automatically and alternately cut off or close the ports, thereby obviating the necessity of utilizing slide valves, check valves and the like that require special construction and arrangement.

A further novel feature of the motor is a sectional piston ring which is assembled whereby anti-frictional devices can be easily installed.

The essential features of the invention, involved in carrying out the objects above indicated, are necessarily susceptible to a wide range of structural modifications without departing from the spirit or sacrificing any of the advantages of the invention, but a practical embodiment thereof is illustrated in the drawings, wherein—

Figure 1:
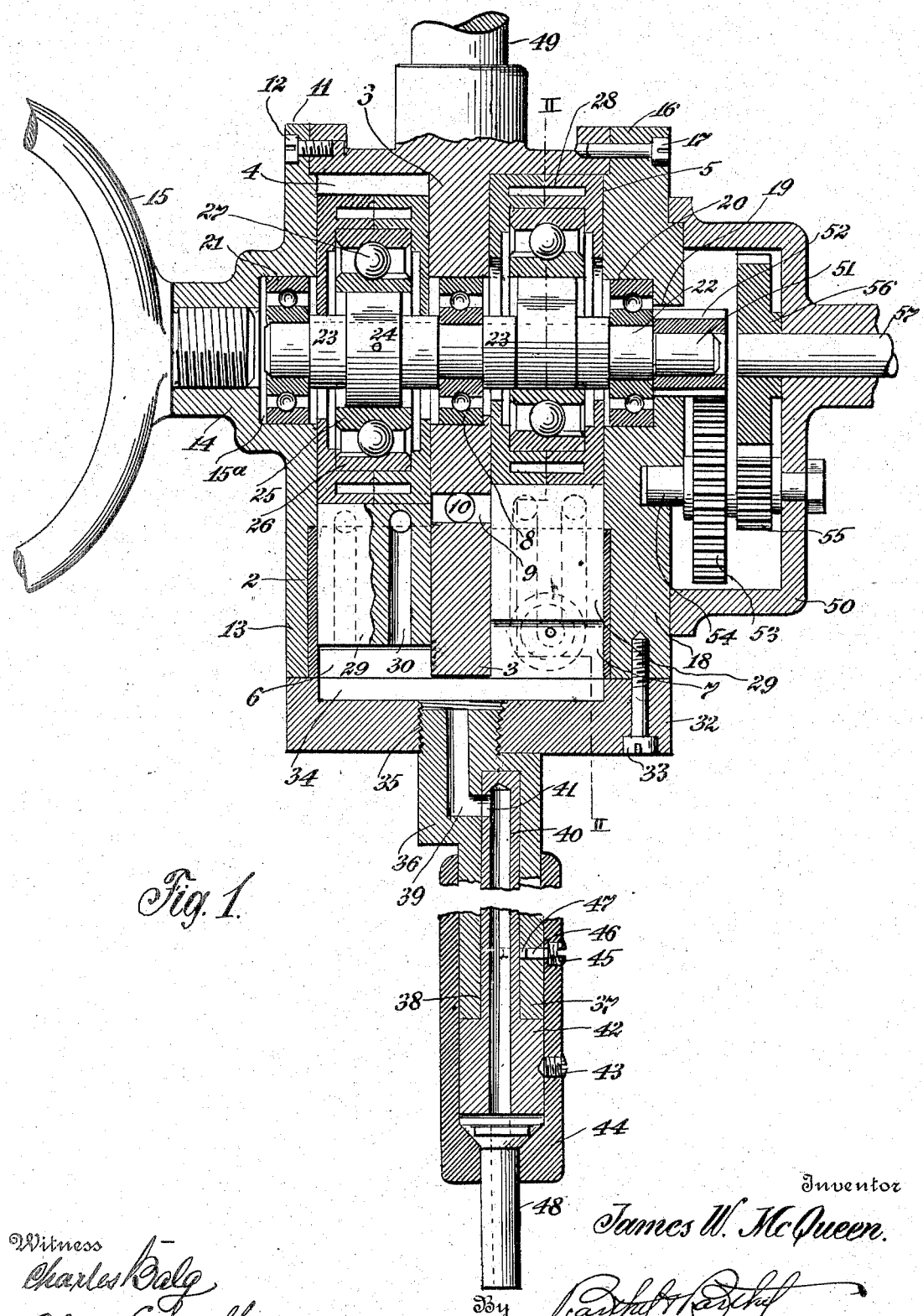
Figure 1 is a longitudinal sectional view of a rotary motor.

In the drawings, the reference numeral 1 denotes a cylinder provided with a radially disposed longitudinal piston casing 2 and with a central partition 3 that divides the cylinder into chambers 4 and 5 and extends into the piston casing 2 to divide the same into piston ways 6 and 7 in communication with the chambers 4 and 5 respectively. The central partition 3 has a concentric stepped opening and an offset port 9 communicating with the chambers 4 and 5 adjacent the inner ends of the piston ways 6 and 7. The partition 3 has a transverse port 10 communicating with the port 9, intermediate the ends thereof, and extending to a wall of the cylinder. The ports 9 and 10 constitute an exhaust for the chambers 4 and 5 and the location of the ends of the port 9 is essential in order that driven elements in the chambers 4 and 5 can alternately close the ends of the port 9.

11 denotes an inner head connected to the cylinder 1 by screw bolts 12 or other fastening means, said head having a radially disposed extension 13 forming a wall of the piston casing 2. The head 11 has a concentric boss 14 provided with a recess 15$^a$ corresponding in diameter to the opening 8 of the partition 3. Screwed into the boss 14 is a detachable breast piece 15 that facilitates manipulating the motor before a piece of work.

16 denotes an outer head connected to the cylinder 1 by screw bolts 17 or other fastening means, said outer head having a radial extension 18 that forms the wall of the piston casing 2. The outer head 16 has a concentric opening 19 and a recess 20, the latter corresponding to the recess 15$^a$ of the boss 14.

21 denotes anti-frictional devices mounted in the opening 8 of the partition 3 and the recesses 15 and 20 of the inner and outer heads 11 and 16 respectively, each anti-frictional device comprising balls interposed between concentric rings. Each device is a bench assembled proposition and as a unitary structure it can be easily placed in the motor.

22 denotes a drive shaft mounted in the inner rings of the anti-frictional device 21 and mounted upon said shaft, between the anti-frictional devices, are the hubs 23 of opposing eccentrics 24. Shrunk or otherwise mounted upon the eccentric 24 are the inner rings 25 of anti-frictional devices, which include outer rings 26 and interposed balls 27. These large anti-frictional devices are constructed upon the same principle as the devices 21 and the large anti-frictional devices are of greater width than the eccentric 24.

28 denotes sectional piston rings loosely mounted upon the outer rings 26 of the large anti-frictional devices, each piston ring being composed of two confronting sections cored out or cut away to reduce the weight of the same. The sectional piston rings have the peripheries thereof in rolling or wiping contact with the annular walls of the chambers 4 and 5, and the end or flat walls of the piston ring wipe the partition 3 and the inner and outer head 11 and 16. With the piston rings wiping the walls of the partition 3, said piston rings serve functionally as cut off means for the ends of the port 9, thereby controlling the exhaust of the chambers 4 and 5. The piston rings practically house the large anti-frictional devices and with the flat walls of said piston rings between the large anti-frictional devices, the inner and outer heads and the central partition, it is practically impossible for the elements 25 to 28 inclusive to become accidentally displaced.

Figure 2:
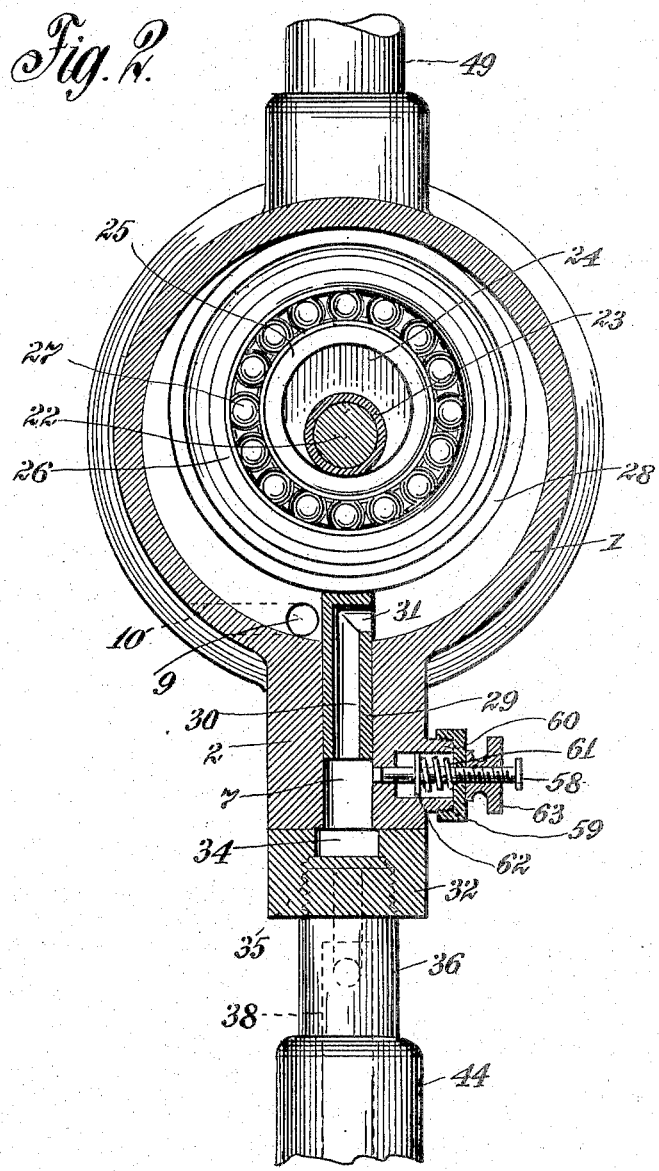
Fig. 2 is a cross sectional view taken on or about line II—II of Fig. 1.

The reference numeral 29 denotes flat pistons slidable in the piston ways 6 and 7 and corresponding in cross section to the cross sectional area of said piston ways. Each piston has longitudinal inlet ports 30 extending from the outer ends thereof to a point in proximity to the inner ends of said pistons, where the ports 30 communicate with lateral ports 31 opening in a direction opposite that of the exhaust port 9, whereby when the pistons 29 extend into the chambers 4 and 5, said chambers can simultaneously receive and exhaust motive fluid. The inner ends of the piston 29 are retained normally in engagement with the periphery of the piston ring 28 by pressure of motive fluid in the piston ways 6 and 7 and the ports 30 and 31 of the piston, and when the pistons 29 are retracted, the ports 31 thereof are closed by walls of the piston ways 6 and 7, such closure occurring when the piston rings 28 close the ends of the exhaust port 9. By reference to Fig. 2, it will be observed that the ports 31 have a clear and uninterrupted discharge into a chamber space while another chamber space is exhausting, said pistons serving functionally as partitions for dividing inlet and exhaust spaces between the walls of the cylinders and the piston rings of the rotary motor.

32 denotes a cap or closure secured to the open end of the piston casing 2 by screw bolts 33 or other fastening means, said cap or closure having the inner side thereof provided with a groove 34 communicating with the outer end of the piston ways 6 and 7, said groove constituting a motive fluid inlet common to said piston ways. The cap or closure 32 has an opening 35 with the walls thereof screw threaded.

36 denotes the offset nipple of a cylindrical valve body 37, which is provided with a longitudinal bore 38 in communication with a port 39 in the nipple 36. The nipple 36 is mounted in the opening 35 of the cap or closure 32 and establishes communication between the groove 34 and the bore 38. Rotatable in the bore 38 of the cylindrical valve body 37 is a tubular plug 40 the inner end of which is provided with a port 41 adapted to communicate with the port 39. The outer end of the plug 40 terminates in a head 42 and inclosing said head and connected thereto by a screw 43 or other fastening means is a hand piece 44 rotatable upon the valve body 37. The hand piece 44 is limited in its movement relative to the valve body 37 by a set screw 45 having a pin 46 extending into a segment slot 47 provided therefor in the valve body 37. With the pin 46 in engagement with one end wall of the slot 47, the port 41 registers with the port 39, but with the pin 46 in engagement with the opposite end wall of the slot 47 the port 41 is closed by the wall of the bore 38 and the port 39 closed by the wall of the plug 40. The hand piece 44 has a connection 48 whereby motive fluid under pressure can be supplied to the rotary motor.

49 denotes a handle carried by the cylinder 1 opposite the valve body 37, the hand piece 48 of said valve body coöperating with the handle 49 in facilitating the manipulation of the rotary motor especially when the breast piece 15 is held against the body of an operator.

50 denotes a gear housing connected to the outer head 16 of the cylinder and into which protrudes the reduced end 51 of the drive shaft 19. Mounted upon the reduced end 51 of said drive shaft is a small gear wheel 52 meshing with a large gear wheel 53 mounted upon a shaft 54 journaled in the housing 50. The shaft 54 has a small gear wheel 55 meshing with a large gear wheel 56 mounted upon a driven shaft 57 journaled in the housing 50. It is to the driven shaft 57 that a suitable tool, as a drill, can be connected. The train of gear wheels decreases the speed of the driven shaft 57 relative to the drive shaft 22 and constitutes a conventional form of transmission.

58 denotes a screw adapted to extend into the piston way 7 of the casing 2 to hold the piston 29 in an extended position, thereby locking the shaft 22 against rotation, thus facilitating the removal of a tool or drill from the driven shaft 27. The screw 58 extends through a cap 59 detachably mounted upon a boss 60 carried by the casing 2, and within the boss 60 is a coiled compression spring 61 which encircles the screw 58 and bears against a collar 62 forming part of said screw. On the outer end of the screw 58 is a knurled nut 63 that holds the screw in a retracted position, but by unscrewing the nut 63 the spring 61 shifts the screw into the piston way 7 in the path of the piston 29. The elements 58 and 63 inclusive constitute a locking device for the operating mechanism of the rotary motor and obviates the necessity of using a wrench or other tool to hold the driven shaft 57 while a drill or tool is removed therefrom.

In operation the rotary motor is held somewhat similar to an ordinary brace and bit, that is, for certain work, the breast piece 15 is held against the body and the axial alining hand pieces in the hands, the right hand controlling the admission of motive fluid to the motor. Motive fluid admitted to the piston casing produced a constant pressure against the pistons 29, consequently said pistons are retained normally in engagement with the periphery of the piston rings 28, and with the motive fluid alternately admitted to the chambers 4 and 5, the piston rings 28 are shifted within the chambers and impart a rotary movement to the drive shaft 51 which is rotated by the transmission to impart the desired rotation to the shaft 57 to which a tool is attached. The wiping action of the piston rings 28 against the annular walls of the chambers 4 and 5 insures a sliding connection that prevents motive fluid from escaping from one chamber space to another, and with these chamber spaces divided by the reciprocal pistons, a positive and uninterrupted movement is imparted to the piston rings and the drive shaft.

Considerable importance is attached to the location of the exhaust port, as the exhaust of motive fluid from the chambers of the cylinder is automatically controlled by the piston rings alternately closing the ends of the exhaust port.

While there has been illustrated a preferred embodiment of my invention, it is to be understood that the structural elements are susceptible to such variations and modifications as fall within the scope of the appended claims.

What I claim is:—

1. In a portable rotary motor, a cylinder, a piston casing carried thereby and providing a piston way in communication with said cylinder, said cylinder having an exhaust port in proximity to the inner end of said piston way, a drive shaft concentric of said cylinder, an eccentric on said drive shaft in said cylinder, an anti-frictional device on said eccentric, a two-part piston ring having its parts loose on said anti-frictional device in contact with the walls of said cylinder and adapted to close the exhaust port thereof, and a ported piston in said piston way normally held in engagement with said piston ring and adapted to admit motive fluid to said cylinder.

2. In a portable rotary motor, a cylinder provided with an exhaust port, a piston casing carried thereby providing a piston way in proximity to the exhaust port of said cylinder, a drive shaft concentric of said cylinder, an eccentric on said shaft in said cylinder, an anti-frictional device on said eccentric, a two-part piston ring having its parts loose on said anti-frictional device and contacting with the walls of said cylinder and adapted to close the exhaust port thereof, a ported piston slidable in said piston way and normally maintained in engagement with said two-part piston ring and adapted to admit motive fluid to said cylinder, heads closing the ends of said cylinder, a driven tool carrying shaft supported from one of said heads and adapted to have movement imparted thereto by said drive shaft, and means carried by said cylinder and the other head thereof adapted to facilitate holding said motor.

3. In a portable rotary motor, a cylinder, a radial piston casing carried thereby, a partition in said cylinder and extending into said casing dividing said cylinder into chambers and said casing into piston ways, said partition having an exhaust port therein common to the chambers of said cylinders, a longitudinal drive shaft journaled in said cylinder, eccentrics on said shaft in the chambers of said cylinders and in opposing relation to each other, anti-frictional devices on said eccentrics, sectional piston rings loose on said devices and housing the same and adapted to alternately close the inner ends of said exhaust port, said piston rings being disposed to wipe the walls of said cylinder chambers, ported pistons slidable in said piston ways for admitting motive fluid to the chambers of said cylinders and normally held against said piston rings by motive fluid admitted to said piston ways, and valvular means for controlling the admission of motive fluid to said piston ways.

4. In a portable rotary motor, a cylinder, a radial piston casing carried thereby, a partition in said cylinder and extending into said casing dividing said cylinder into chambers and said casing into piston ways, said partition having an exhaust port therein common to the chambers of said cylinders and in proximity to the piston ways of said casing, heads closing the ends of said cylinders at the sides of said casing, a cap closing the end of said casing, a longitudinal drive shaft journaled in said cylinder, eccentrics on said shaft in the chambers of said cylinder, anti-frictional devices on said eccentrics, sectional piston rings loose on said devices and housing the same and adapted to alternately close the inner ends of said exhaust port, ported pistons slidable in said piston ways for admitting motive fluid to the chambers of said cylinders, valvular means carried by said cap for controlling the admission of motive fluid to said piston ways, a housing carried by the other of said heads, a drive shaft journaled therein, and a transmission in said housing between said drive and driven shafts.

5. In a portable rotary motor, a cylinder, a radial piston casing carried thereby, a partition in said cylinder and extending into said casing dividing said cylinder into chambers and said casing into piston ways, said partition having an exhaust port therein common to the chambers of said cylinders, and in proximity to the piston ways, a longitudinal drive shaft journaled in said cylinder, eccentrics on said shaft in the chambers of said cylinder, anti-frictional devices on said eccentrics, sectional piston rings loose on said devices and adapted to alternately close the inner end of said exhaust port, a piston slidable in said piston ways for admitting motive fluid to the chambers of said cylinder, and valvular means for controlling the admission of motive fluid to said piston ways.

6. In a portable rotary motor, a cylinder, a piston casing carried thereby, a partition in said cylinder and extending into said casing dividing said cylinder into chambers and said casing into piston ways, said partition having an exhaust port therein common to the chambers of said cylinder and in proximity to the piston ways, heads closing the ends of said cylinder and the sides of said casing, a cap closing the end of said casing, a drive shaft journaled in said cylinder, eccentrics on said shaft in the chambers of said cylinder and in opposing relation to each other, anti-frictional devices on said eccentrics, sectional piston rings loose on said devices and housing the same and adapted to alternately close the inner ends of said exhaust port, said piston rings being disposed to wipe the walls of said cylinder chambers, ported pistons slidable in piston ways for admitting motive fluid to the chambers of said cylinder and normally held against said piston rings by motive fluid admitted to said piston ways, and valvular means carried by said cap for controlling the admission of motive fluid to said piston ways.

7. In a portable rotary motor, a cylinder having an exhaust port, a piston casing carried thereby and providing a piston way in proximity to said port, a drive shaft longitudinally of said cylinder, an eccentric on said shaft in said cylinder, an anti-frictional device on said eccentric, a sectional piston ring loose on said device and housing the same, and adapted to wipe the walls of said cylinder and close the exhaust port thereof, a ported piston slidable in the piston way of said casing and adapted to admit motive fluid to said cylinder for imparting movement to said sectional piston ring and to said drive shaft, and a locking device carried by said piston casing and adapted to extend into the piston way thereof to hold the piston in an extended position and said shaft against rotation.

8. In a portable rotary motor, a cylinder, a radial piston casing carried thereby, a partition in said cylinder and extending into said casing dividing said cylinder into chambers and said casing into piston ways, said partition having an exhaust port therein common to the chambers of said cylinders, a longitudinal drive shaft journaled in said cylinder, eccentrics on said shaft in the chambers of said cylinders and in opposing relation to each other, anti-frictional devices on said eccentrics, sectional piston rings loose on said devices and housing the same and adapted to alternately close the inner ends of said exhaust port, said piston rings being disposed to wipe the walls of said cylinder chambers, ported pistons slidable in said piston ways admitting motive fluid to the chambers of said cylinder and normally held against said piston rings by motive fluid admitted to said piston ways, valvular means for controlling the admission of motive fluid to said piston ways, and a locking device carried by said piston casing and adapted to extend into one of the piston ways thereof to hold the piston in said piston way in an extended position and thereby lock the drive shaft against rotation.

In testimony whereof I affix my signature in presence of two witnesses.

JAMES W. McQUEEN.

Witnesses:
KARL H. BUTLER,
ANNA M. DORR.